United States Patent Office 3,301,827
Patented Jan. 31, 1967

3,301,827
POLYMERS FROM POLYCYCLIC REACTANTS HAVING FUNCTIONAL SUBSTITUENTS ON BRIDGEHEAD CARBON ATOMS
Elmore Louis Martin, Wilmington, Del., assignor to E. I. du Pont de Nemours and Company, Wilmington, Del., a corporation of Delaware
No Drawing. Filed May 7, 1965, Ser. No. 454,202
6 Claims. (Cl. 260—78)

This application is a continuation-in-part of my copending application Serial No. 46,386, filed August 1, 1960, which in turn is a continuation-in-part of my application Serial No. 819,013 filed June 9, 1959, both now abandoned.

This invention relates to new and useful synthetic polymers and to certain new and useful polycyclic diamines.

The textile fiber industry is constantly endeavoring to obtain fibers of synthetic polymeric material which have good mechanical properties and which can retain these properties by withstanding the degradative effects of heat and oxidation. Molecular structure is a primary factor in affecting the mechanical properties of polymers due to its direct influence on crystallinity and orientation.

It is therefore an object of this invention to provide a broad class of polymers which have improved mechanical properties.

It is another object to provide polymers which have improved chemical stability, especially resistance to oxidative attack.

These and other objects will become more apparent in the course of the following specification and claims.

In accordance with this invention there is provided a fiber-forming, synthetic polymer containing a recurring unit selected from the class consisting of:

(1) 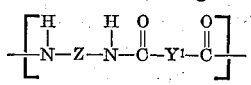

(2) 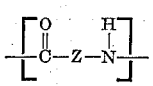

(3) 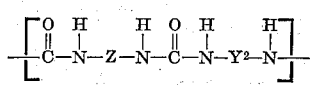

(4) 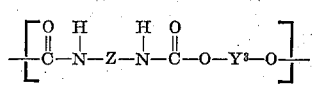

(5) 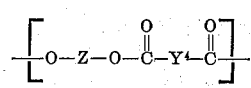

and (6) 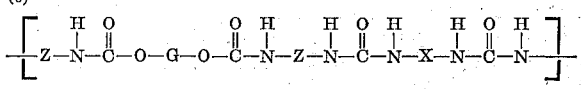

wherein Z is a divalent polycyclic radical of the formula selected from the class consisting of:

(7)  (8) 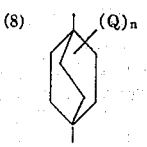 (9) 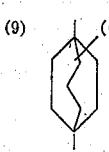

(10) 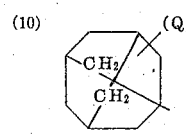 (11) 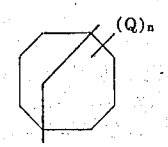

and

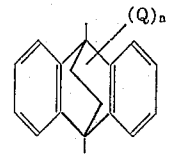

$Y^1$, $Y^2$, $Y^3$, and $Y^4$ are divalent organic radicals other than Z, X is a divalent radical selected from the class consisting of (a) Z and (b) a divalent organic radical other than Z, Q is a monovalent organic radical substituent selected from the class consisting of, lower alkyl, cycloalkyl, aryl, lower alkyl substituted aryl, aryl substituted lower alkyl with $n$ being 0, 1 or 2; G is a divalent polymeric radical having a melting point below about 60° C. and a molecular weight of between about 400 and 5000, G consisting essentially of intralinear alkylene groups interrupted by linkages selected from the class consisting of (a) ether oxygen and (b) carbonyloxy; and copolymer units when present being selected from the class consisting of an amide, an ester, a urea, and a urethane.

The divalent organic radicals $Y^1$ and $Y^4$ are radicals of the class consisting of alkylene, arylene, cycloalkylene, alkarylene, and aralkylene. The foregoing radicals represent the hydrocarbon portion of conventional dicarbonyl containing organic compounds capable of condensing with diamines and diols to provide polyamides and polyesters, respectively. Exemplary of such dicarbonyl containing compounds are diacids and ester-forming derivatives thereof, such as oxalic acid, suberic acid, azelaic acid, bibenzoic acid, hydroterephthalic acid, adipic acid, 3-methyladipic acid, pimelic acid, sebacic acid, isosebacic acid, decanedioic acid, terephthalic acid, isophthalic acid, 2,2,5,5-tetramethyladipic acid, and the like. Some of these diacids and their ester-forming derivatives, as well as others, are disclosed in United States Patents 2,071,250; 2,130,523; 2,130,948; and 2,465,319.

The divalent organic radical denoted as $Y^2$, and the divalent radical denoted as X (when X is not a polycyclic radical Z) are radicals of the class consisting of alkylene, arylene, cycloalkylene, alkarylene, and aralkylene, such radicals representing the hydrocarbon portion of conventional diamines and diisocyanates capable of entering into condensation polymerization reactions. Exemplary of such diamines are aliphatic diamines of the formula $H_2N—(CH_2)_n—NH_2$ where $n$ is an integer from 2 to about 10; p-xylylenediamine, 1,4-diaminocyclohexane; 1,3-diaminobenzene; bis(p-aminocyclohexyl)methane; and the like. Some of these diamines, as well as others, are disclosed in United States Patents 2,071,250; 2,130,523; 2,130,948, the disclosures of which patents are intended to be incorporated herein by reference. Suitable diisocyanates include, in addition to those which correspond to the just-mentioned diamines, p-phenylene diisocyanate; 4,4'-biphenylene diisocyanate; p,p'-isopropylidene diphenyl diisocyanate, 4-methyl-m-phenylene diisocyanate; methylene bis(4-phenylisocyanate); 4-chloro-1,3-phenylene diisocyanate; 1,5-naphthylene diisocyanate; and 1,5-tetrahydronaphthalene diisocyanate. Arylene diisocyanates, i.e., those in which each of the diisocyanate groups is attached directly to an aromatic ring, are preferred to complement the polycylic diisocyanates.

The divalent organic radical $Y^3$ is also a radical selected from the class consisting of alkylene, arylene, cycloalkylene, aralkylene, and alkarylene, such radicals representing the hydrocarbon portion of conventional dihydroxy compounds and derivatives thereof capable of condensing with diacids to form polyesters. Exemplary of such dihydroxy compounds are diols of the formula $HO—(CH_2)_n—OH$ where $n$ is an integer from 2 to about 10, 2,2-bis(4-hydroxyphenyl)propane, hexahydro-p-xylene glycol, and the like. Some of these diols, as well as others, are disclosed by Whinfield and Dickson in United States Patent 2,465,319, the disclosure of which is intended to be incorporated herein by reference.

The preferred polycyclic radicals are those in which about two of the substituents represented by Q are lower alkyl, and the remaining substituents are hydrogen. Most preferable are those polycyclic radicals where Q is hydrogen only. By the term "lower alkyl" is meant an alkyl group of up to about five carbon atoms, e.g., methyl, propyl, neo-pentyl.

The polycyclic diamines of this invention have the structural formula selected from the class comprising:

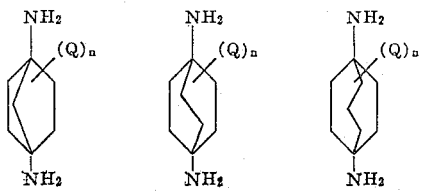

and

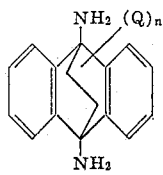

wherein Q is a monovalent organic radical selected from the class consisting of lower alkyl, cycloalkyl, aryl, lower alkyl substituted aryl, and aryl substituted lower alkyl, preferably lower alkyl with $n$ being 0, 1 or 2. Most preferably $n$ is zero.

The diamines of this invention can be prepared from the corresponding dinitro compounds or dicarboxylic acids. The bicyclo[2.2.2]octane-1,4-dicarboxylic acid that is used in Example I below, as well as the bicyclic dicarboxylic acids bearing alkyl, cycloalkyl, aryl, alkaryl, and aralkyl substituents on the bicyclic ring, can be prepared by the procedure of P. C. Guha, Chem. Ber., 72B, 1359 (1939). This procedure involves cyclization of diethyl succinate to diethyl succinoyl succinate, followed by reaction with ethylene bromide to form diethyl 2,5-dioxobicyclo[2.2.2]octane-1,4-dicarboxylate which, on reduction and hydrolysis, yields the desired dicarboxylic acid. In preparing the diamines of this invention from the dicarboxylic acid, the acid is first converted to the corresponding acid halide, which in turn is transformed to the corresponding acyl azide, the decomposition of which gives the corresponding diisocyanate and the latter on hydrolysis yields the diamine. The sequence of reaction, illustrated with bicyclo[2.2.2]octane - 1,4 - dicarboxylic acid, is:

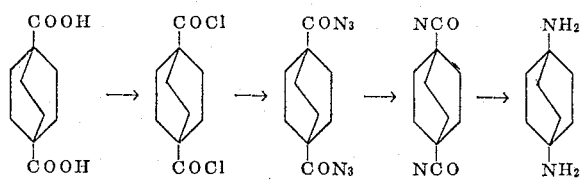

In an alternative method which is particularly useful for preparing bridgehead bicyclic heptanediamines, a dinitroheptane is dissolved in a suitable solvent, e.g., diethyl ether, and the solution is then added slowly with stirring to a solution of a reducing agent, for example, lithium aluminum hydride. The mixture is stirred to insure complete reaction, excess lithium aluminum hydride is decomposed with moist diethyl ether, and the mixture is then treated with aqueous caustic alkali. The ether layer is separated and the ether removed by evaporation. The free amine is purified by recrystallization from diethyl ether solution.

A starting material for preparing the diols for typical polyesters for this invention is 1,4-dichloro bicyclo-[2.2.2]octane which may be prepared according to the method of Lukes and Langthaler, Coll. Czech. Chem. Comm., 24, 2109 (1959). This starting material can also be prepared from the commercially available compound perchlorocoumalin, by heating the compound slowly to 170° C. in a stainless-steel autoclave under a maximum ethylene pressure of 1,000 atmospheres. After 10 hours, the reaction product is cooled and distilled through a short column (B.P. 121° C./3.5 mm.) to yield solidified substantially pure 1,2,3,4-tetrachlorobicyclo-[2.2.2]oct-2-ene. Recrystallization from hexane gives white crystals melting at 95.5° C. to 96° C. A solution of this tetrachlor compound in ethanol is treated with hydrogen in a glass hydrogenation apparatus at a pressure of 40 p.s.i.g. using platinum oxide catalyst, care being taken to avoid contaimination of the solution with metallic ions which inactivate the catalyst. A crystalline 1,4-dichloro-bicyclo[2.2.2]octane deposits directly from the solution which when recrystallized from hexane has a melting point of 233.5 to 234.5° C. The production of 1,4 - dihydroxybicyclo[2.2.2]octane from 1,4 - dichlorobicyclo[2.2.2]octane is specified in Example IX.

The following examples are cited to illustrate the invention and are not intended to limit it in any manner. The term "polymer melt temperature," is conventionally defined as the temperature at which a polymer sample becomes sufficiently molten to leave a trail when moved across a hot metal surface under moderate pressure.

Example I

This example shows the preparation of bicyclo[2.2.2]-octane-1,4-diamine.

A mixture of 15 grams bicyclo[2.2.2]octane-1,4-dicarboxylic acid and 25 ml. redistilled thionyl chloride is boiled under reflux for 24 hours. After evaporation of excess thionyl chloride, the residue is distilled at 108–120° C./2.5 mm. to yield 16.6 g. of 1,4-bicyclo[2.2.2]-octane dicarbonyl chloride This is dissolved in 50 ml. of acetone and the solution added to a chilled solution of 13 g. of sodium azide in 40 ml. of water. The mixture is stirred for one hour at 10° C. (±2°C.) and the diacyl azide is then collected by filtration. The azide is dissolved in 60 ml. of benzene, the solution added slowly to 80 ml. of benzene at 70° to 75° C., and the resulting solution boiled under reflux for two hours. The diisocyanate so formed, while still in solution in benzene, is heated with 100 ml. of concentrated hydrochloric acid for two hours and the aqueous layer evaporated to dryness.

The amine hydrochloride so formed is covered with a solution of 20 g. of potassium hydroxide in 20 ml. of water and with 100 ml. of diethyl ether. The ether layer is separated, dried over solid KOH, and the solution distilled to yield 2.8 g. of solid (B.P. 139° C./79 mm.) which upon recrystallation from ether gives fine white needles with a melting point of 79–83° C. The results of elemental analysis indicated the product to be a hydrate of bicyclo [2.2.2]octane-1,4-diamine.

Calcd. for $C_8H_{16}N_2 \cdot H_2O$: C, 60.72; H, 11.46, N, 17.71; O, 10.11. Found: C, 60.56; H, 10.94; N, 17.82; O, 10.68. The neutral equivalent calculated for $C_8H_{16}N_2 \cdot H_2O$ is 79.1 whereas it is found to be 79.0.

In a similar experiment starting with 16 g. of bicyclo [2.2.2]octane-1,4-dicarboxylic acid, the acryl chloride is obtained on distillation at 92–95° C./0.3 mm., M.P. 69–71.5° C., and the bicyclo[2.2.2]octane-1,4-diammonium chloride obtained as above. This amine hydrochloride (12.1 g.) is stirred with 20 g. of 85% KOH in 100 ml. of diethyl ether, the ether layer decanted, and evaporated to dryness. The residue is sublimed at 65° C./2 mm., and recrystallized from diethyl ether to yield 6 g. of bicyclo[2.2.2]octane-1,4-diamine, M.P. 62–64° C. The result of the elemental analysis of the diamine is:

Calcd. for $C_8H_{16}N_2$: C, 68.52%; H, 11.50%; N, 19.98%; N.E., 70.1. Found: C, 68.32%; H, 11.22%; N, 20.53%; N.E., 71.

The proton magnetic resonance of the bicyclo[2.2.2]-octane-1,4-diamine contains only one band, a strong resonance at the point assignable to methylene or amino protons.

The infrared spectrum of the diamine contains bands at 3.4 and 3.5μ assignable to methylene groups and at 2.95 and 3.05μ assignable to amino groups.

In place of the bicyclo[2.2.2]octane-1,4-dicarboxylic acid used in Example I, there can be used 2-phenylbicyclo[2.2.2]octane-1,4-dicarboxylic acid, 2-cyclohexylbicyclo[2.2.2]octane-1,4-dicarboxylic acid, 2-octylbicyclo[2.2.2]-octane-1,4-dicarboxylic acid, 2,5-dimethylbicyclo[2.2.2]octane-1,4-dicarboxylic acid, 2,5-dibenzylbicyclo[2.2.2]octane-1,4-dicarboxylic acid, 2,5-di-p-tolylbicyclo[2.2.2]octane-1,4-dicarboxylic acid, bicyclo[3.2.2]nonane-1,5-dicarboxylic acid, 6-ethylbicyclo[3.2.2]nonane-1,5-dicarboxylic acid, 6,8-dicyclopentylbicyclo[3.2.2]nonane-1,5-dicarboxylic acid, and the like.

If the above dicarboxylic acids are substituted for the bicyclo[2.2.2]octane-1,4-dicarboxylic acid in the process of Example I, the following bridgehead diamines, respectively, will be obtained:
2-phenylbicyclo[2.2.2]octane-1,4-diamine
2-cyclohexylbicyclo[2.2.2]octane-1,4-diamine
2-octylbicyclo[2.2.2]octane-1,4-diamine
2,5-dimethylbicyclo[2.2.2]octane-1,4-diamine
2,5-dibenzylbicyclo[2.2.2]octane-1,4-diamine
2,5-di-p-tolylbicyclo[2.2.2]octane-1,4-diamine
bicyclo[3.2.2]nonane-1,5-diamine
6-ethylbicyclo[3.2.2]nonane-1,5-diamine
6,8-dicyclopentylbicyclo[3.2.2]nonane-1,5-diamine

*Example II*

This example illustrates the preparation of bicyclo[2.2.1]heptane-1,4-diamine.

A chilled solution of 13.8 g. of nitrogen dioxide and 19.2 g. of bicyclo[2.2.1]heptane in 15 ml. of chlorobenzene is dropped over a period of 2 hours into a heated (400° C.) reaction tube packed with glass beads. The products are collected in a trap maintained at 0° C., dried over anhydrous magnesium sulfate, and distilled. Three fractions are separated as follows:

| Fraction | B.P., ° C. | Product |
| --- | --- | --- |
| 1 | 100–108 | Bicyclo[2.2.1]heptane. |
| 2 | 42–48/42 mm | Chlorobenzene. |
| 3 | 50–58/2 mm | 1-nitrobicyclo[2.2.1]heptane. |

Fraction 3, the mononitro derivative of bicyclo[2.2.1]heptane, has an $n_D^{25} = 1.4782$.

Two grams of the mononitro derivative, prepared as above, and 1.0 g. of nitrogen dioxide in 2.5 ml. of chlorobenzene is dropped over a period of 25 minutes into a heated (400° C.) reaction tube packed with glass beads. The products are collected in a trap cooled in ice water, and distilled up to 53° C./1.5 mm. to yield a viscous red residue (200 mg.) which is triturated with 2 ml. of petroleum ether. A yellow crystalline solid characterized as the 1,4-dinitro derivative of bicyclo[2.2.1]heptane is recovered, then dissolved in 5 ml. of diethyl ether and the solution added slowly to 190 mg. of lithium aluminum hydride in 10 ml. of diethyl ether. The mixture is stirred at reflux overnight. Excess lithium aluminum hydride is decomposed with moist diethyl ether, and the product which forms is treated with 10% aqueous sodium hydroxide. The ether layer is separated, dried over sodium hydroxide pellets, filtered, and the ether removed by evaporation under a nitrogen blanket. The residual crude bicyclo[2.2.1]heptane-1,4-diamine is treated with 1.0 ml. of 10% aqueous sodium hydroxide and 0.2 ml. of benzoyl chloride for two hours. The mixture is then extracted with diethyl ether, the ether extract dried over magnesium sulfate, and the ether removed by evaporation under a nitrogen blanket. The solid residue is crystallized from methanol to yield the dibenzamide of 1,4-bicyclo[2.2.1]heptanediamine, M.P. 194–200° C. The free diamine may be obtained by hydrolysis of the benzamide. Similar results were obtained when 150 mg. of the dinitro heptane were employed.

In place of the 1,4-dinitro derivative of bicyclo[2.2.1]heptane used in this Example, there can be used the 1,4-dinitro derivatives of 2-methylbicyclo[2.2.1]heptane, bicyclo[2.2.2]octane, and the 1,5-dinitro derivatives of bicyclo[3.2.2]nonane, bicyclo[3.3.1]nonane, and the like.

The above 1,4-dinitro derivatives can be made by the procedure described for preparing the 1,4-dinitro derivative of bicyclo[2.2.1]heptane.

Substitution of the above 1,4-dinitro derivatives for the 1,4-dinitro derivative of bicyclo[2.2.1]heptane of Example II in the process of Example II leads to the formation of 2-methylbicyclo[2.2.1]heptane-1,4-diamine, bicyclo[2.2.2]octane - 1,4 - diamine, bicyclo[3.2.2]nonane-1,5-diamine, bicyclo[3.3.1]nonane-1,5-diamine, and the like.

*Example III*

Equimolar proportions of the diamine prepared in Example I and sebacic acid are dissolved in water to form 1,4 - bicyclo[2.2.2]octanediammonium sebacate. After drying, 3.68 grams of this salt is heated in a sealed tube for one hour at 280° C., then for 1½ hours at 283° C. in a nitrogen atmosphere at atmospheric pressure, and finally for 2 hours at 283° C. under vacuum. The product, poly(bicyclo[2.2.2]oct-1,4-ylene sebacamide), has an inherent viscosity (m-cresol at 25° C.) of 0.85 and a melt viscosity of 3900 poises at 280° C.

The superior melt stability is illustrated by the fact that heating of the polymer under nitrogen atmosphere at 283° C. for 30 hours causes the inherent viscosity to drop 20% (from 0.85 to 0.68). Under similar conditions poly-(hexamethylene adipamide) gels, and poly (1,1,4,4-tetramethyl tetramethylene suberamide) shows a drop in inherent viscosity of 73% (from 1.15 to 0.14).

The polymer is cut into flake and melt-spun at 260–265° C. and 250–300 p.s.i. pressure at 75 y.p.m. and drawn at a draw ratio of 2.5 at 80° C. to a 27 total-denier yarn. The filaments of poly(bicyclo[2.2.2]oct-1,4-ylene sebacamide) exhibit improved oxidation resistance, modulus, and resilience over filaments from poly(hexamethylene adipamide). The improved oxidation resistance is illustrated by the tenacity drop after a 40-hour exposure to light in a Fade-O-Meter. The tenacity drops 14% (from 0.98 grams per denier) compared to a drop of 38% (from 5.9 grams per denier to 3.6 grams per denier) for 66 nylon. Similar improvement is obtained with poly (bicyclo [2.2.1]hept-1,4-ylene sebacamide).

*Example IV*

Dry 4-aminobicyclo [2.2.2.]octane-1-carboxylic acid is heated for 1½ hours at 283° C. in a nitrogen atmosphere at atmospheric pressure, then for 2 hours at 283° C. under vacuum (about 2 mm.). The product, poly(1-bicyclo[2.2.2.]oct-ylene-4-carbonamide), is cut into flake, melt-spun from a screw extruder at 265° C. and 275 p.s.i. pressure, and drawn at a draw ratio of 2.5 at 80° C. to a 27 total-denier, 5-filament year. The polymer of this example has superior melt stability and the filaments that are produced have improved oxidation resistance, improved modulus, and improved resilience.

*Example V*

Equimolar proportions (plus 4% excess diamine) of adamantane-1,3-diamine and sebacic acid are dissolved in ethyl alcohol and ether added to precipitate 1,3-adamantane diammonium sebacate. After drying, this salt is sealed in a tube and heated for 1½ hours at 220° C., then for ¼ hour at 260° C. in nitrogen atmosphere at atmospheric pressure, and for 1½ hours at 260° C. under vacuum (about 0.03 mm.). The product, melt-spinnable poly(adamant-1,3-ylene sebacamide), has a polymer melting point of 153° C. and an inherent viscosity (m-cresol at 25° C.) of 0.33.

Example VI

This example illustrates the preparation of diamino-9, 10-dihydro-9,10-endoethanoanthracene.

A mixture of 50 grams of anthraquinone and 500 grams of redistilled formamide is refluxed for 8 hours, during which time the solid present initially dissolves and a second solid material begins to separate. The reaction mixture is cooled and filtered to provide a straw-yellow solid which is washed with alcohol and then with water, and again with alcohol and finally with ether to yield 43 grams of 9,10-bis-formamidoanthracene. This is hydrolyzed to the monoformyl-9,10-diaminoanthracene by refluxing for 6 hours with 60 grams of potassium hydroxide and 500 cc. of methyl alcohol. The mixture is cooled, filtered, washed with water, dried, and separated into unhydrolyzed diformyl derivated and 27.5 grams of monoformyl compound (M.P. about 300° C.). An additional 32 grams of monoformyl compound is similarly prepared. The monoformyl compound (59.5 grams) dissolves in 400 ml. of dimethylformamide quite readily and is obtained as a yellow-orange crystalline solid by addition of water to the dimethylformamide. The yield of monoformyl derivative is 26 grams.

The monoformyl-9,10-diaminoanthracene (26 grams) so obtained is heated with 600 cc. of benzene at 200–220° C. with the maximum cylinder pressure of ethylene being fed into a reaction chamber for 48 hours. The chamber is then cooled, vented, and the contents worked up to provide a dark brown benzene solution mixed with a large mass of slightly discolored crystalline material. This mixture is then filtered to provide a solid which weighs 21 grams and is essentially the pure condensation product of the diaminoanthracene and ethylene.

Some of the reaction product obtained from the condensation is sublimed in a high vacuum at 214° C. bath temperature. The sublimate is recrystallized from decahydronaphthalene to give pure white needles melting sharply at 242° C.

More monoformyl-9,10-diaminoendoethanoanthracene is prepared as above, and 88 grams of it is hydrolyzed overnight by mixing with 300 grams of potassium hydroxide in 800 cc. of methanol and an equal volume of water to yield 81 grams of product. This product is refluxed for 6 hours with 450 grams of potassium hydroxide in 750 cc. of methyl alcohol. The mixture is then cooled and diluted with 1 liter of water. The product crystallizes well and is then recrystallized from aqueous alcohol using decolorizing carbon to give 58 grams of a crystalline product melting on the hot stage at 147° to 149° C.

In order to adequately characterize and completely hydrolyze this material, a 2 gram sample is dissolved in 50 cc. tetrahydrofuran added to 50 cc. of 3 molar methyl magnesium bromide. This mixture is stirred for 6 hours, allowed to stand overnight, and then refluxed for 4 hours. It is then poured into ammonium chloride-water and filtered to yield 1.8 grams of solid which melts at about 125° C. The melting point after recrystallization from ethyl alcohol containing a trace of sodium hydroxide to prevent carbonate formation is 147–148° C. Further recrystallization from benzenecyclohexane gives a product melting at 148°–148.5° C. without intermediate phase change. These melting points are observed repeatedly when the compound is obtained from alcohol.

Calcd. for $C_{16}H_{16}N_2$: C, 81.35; H, 6.7; N, 11.9. Found: C, 81.37; H, 6.91; N, 11.7; C, 81.29; H, 6.91; N, 11.7.

Example VII

Equimolar proportions of the diamine of Example VI and isophthalic acid are dissolved in water to form the salt 9,10-dihydroendoethanoanthracene-9,10-diammonium isophthalate. After drying, this salt is sealed in a tube and heated for 1½ hours at 220° C., then for ¼ hour at 260° C. in nitrogen atmosphere at atmospheric pressure, and finally for 1½ hours at 260° C. under vacuum (about 0.03 mm.). The product, melt-spinnable poly(9,10-dihydro-9,10-endoethanoanthr-9,10-ylene isophthalamide), has a polymer melt temperature of 274° C.

Example VIII

Dry 1,4-bicyclo[2.2.2]octane diammonium suberate (2 grams), prepared from the diamine of Example I and suberic acid, is placed in a tube which is then evacuated, sealed and heated at 275° C. for 20 minutes, and then at 220° C. for two hours. The polymer is then heated at 255° C. for one hour under nitrogen at atmospheric pressure. The tube is then evacuated and the polymer heated at 275° C. under reduced pressure for one hour. The resulting polymer, poly(bicyclo[2.2.2]oct-1,4-ylene suberamide), is clear, has a melting point of 170° C., and an inherent viscosity (in m-cresol) of 0.42. Melt extrusion of the polymer yields filaments which exhibit the same improved properties over poly(hexamethylene adipamide) as indicated in Example III. The polymer is cut into flake which is formed into a clear, colorless, brittle film in a press at 130° C. and 1000 p.s.i. The film shows an excellent oxidation resistance.

Where in the above examples thionyl chloride has been used to convert the acid to the corresponding acyl halide, it is to be understood that in its place there can be used other halides, such as thionyl bromide, phosphorous pentachloride, phosphorous oxychloride, and the like.

The formation of the acryl halide can be carried out in the absence of presence of an inert reaction medium, e.g., a chlorinated hydrocarbon such as carbon tetrachloride, chloroform, monochlorobenzene, and the like.

In the reaction between the thionyl halide and the carboxylic acid, the amount of thionyl halide, or equivalent, is at least two moles per mole of acid. Generally, however, an excess of thionyl halide is used and this excess can be up to 100 moles of thionyl halide, or equivalent, per mole of acid.

The conversion of the acid halide to the azide is carried out at temperatures which are usually below ambient and most generally between 0° and 20° C. in the presence of a reaction medium, which can be water or an organic solvent, e.g., dioxane, tetrahydrofuran, methyl ethyl ketone, etc.

The amount of alkali metal azide used in converting the acid halide to the azide is at least two moles per mole of acid halide. Generally, however, the amount of azide will be in the range of 2 to 5 moles per mole of acid halide.

In the step of forming the diisocyanate from the azide, the reaction can be conducted in the presence or absence of a reaction medium at temperatures in the range of 30° to 100° C., preferably 40° to 85° C. Although benzene constitutes a preferred medium, in its place there can be used cyclohexane, methylcyclohexane, and the like.

In place of hydrochloric acid there can be used other strong inorganic acids to convert the diisocyanate through the corresponding diamine to the diamine salt. The conversion is effected by heating the diisocyanate and acid at 50° to 150° C.

Usually the amount of hydrochloric acid, or other strong inorganic acid, employed in converting the diisocyanate to the diamine which, in turn, is converted to the diamine salt, is in the range of 6 to 50 moles per mole of diisocyanate.

In isolating the diamine from the salt any alkali can be used. Convenient and preferred alkalies are sodium and potassium hydroxides. The amount of alkali metal hydroxide employed is from 2 to 100 moles per mole of amine salt and preferably from 3 to 10 moles.

The following examples illustrate the preparation of the polyesters of this invention.

Example IX

A mixture of 305 parts of 1,4-dichlorobicyclo[2.2.2]octane, 200 parts of sodium hydroxide, and 10,000 parts of water is sealed in a reactor having a total volume about 2.5 times the volume of the reactant mixture. The mixture is heated at 300° C. under autogenous pressure for 7 hours, cooled to room temperature, the resulting mixture treated with decolorizing charcoal and then filtered. The aqueous filtrate is extracted continuously with ether for 3 days. About 40 parts of 1,4-dihydroxybicyclo[2.2.2]octane is recovered from the extract in the form of colorless crystals. This product is sublimed at 110° C. and 0.1 mm. pressure to yield purified 1,4-dihydroxybicyclo[2,2.2]octane, which melts at 280° C. with sublimation.

Calcd. for $C_8H_{14}O_2$: C, 67.56; H, 9.93. Found: C, 67.81; H, 10.00.

The identity of the product is confirmed by its proton-magnetic-resonance spectrum and by its infrared-absorption spectrum, which shows strong hydroxyl absorption at 3260 cm.$^{-1}$. The structure is further confirmed by formation of the starting material, 1,4-dichlorobicyclo[2.2.2]octane, when the product is refluxed with excess thionyl chloride for 20 hours.

Example X

A mixture of 40.5 parts by weight of 1,4-dihydroxy-bicyclo[2.2.2]octane, 50.8 parts by weight of isophthaloyl chloride, and 1000 parts by volume of tetrachloroethane is placed in a reactor equipped with a nitrogen sweep and reflux condenser. The mixture is heated at the reflux temperature of the solvent while sweeping with nitrogen. Some polymer precipitates after about two hours, but heating at reflux is continued for a total of 84 hours. The polymer is precipitated by pouring the mixture into acetone. The product has an intrinsic viscosity of 0.41, and is identified as poly(bicyclo[2.2.2]oct-1,4-ylene isophthalate). In another such preparation, where the refluxing is continued for only 48 hours, the product has a melt temperature of 325–330° C.

Example XI

Proceeding as in Example X, but substituting an equal amount of terephthaloyl chloride for the isophthaloyl chloride and refluxing for only 48 hours, the polyester product is poly(bicyclo[2.2.2]oct-1,4-ylene terephthalate). The polyester has an intrinsic viscosity of 0.34 and a polymer melt temperature above 385° C.

Example XII

A mixture of 171 parts of 1,4-bicyclo[2.2.2]octanediol, 173 parts of the dimethyl ester of 4,4''-m-terphenyl-dicarboxylic acid, and 0.5 parts of the catalyst NaKTi-$(OC_4H_9)_6$ (dissolved in butanol) is placed in a reaction vessel equipped with a nitrogen bubble agitator and vacuum connection. The mixture is heated and the pressure reduced over a period of one hour and forty-five minutes, with the final temperature and pressure being 300° C. and 0.8 mm. of mercury, respectively. The product is cooled, finely ground, and then further polymerized in the solid phase by heating slowly at a pressure of 0.5 mm. of Hg to a final temperature of 248° C. after 23 hours. The product is poly(bicyclo[2.2.2]oct-1,4-ylene m-terphenyl-4,4''-dicarboxylate) having a polymer melting temperature of 310–325° C.

Example XIII

The following example illustrates the preparation of a spandex elastomer with adamantane-1,3-diisocyanate.

A mixture of 51 grams of polytetramethylene ether glycol having a molecular weight of about 2,000 and 10.9 grams of adamantane-1,3-diisocyanate is heated at about 50° C., with stirring under nitrogen until it becomes homogeneous. To this mixture is added 0.1% of dibutyltin dilaurate and the mixture is then heated for 1 hour at 70–75° C. to yield an isocyanate-terminated polyether which contains 3.31% NCO. A solution is formed by dissolving 15.0 grams of the isocyanate-terminated polyether prepolymer in 60.0 ml. of dry hexamethylphosphoramide. To this solution is added with stirring at ambient temperature 0.98 grams of adamantane-1,3-diamine dissolved in 5 ml. N,N-dimethylacetamide. A low viscosity solution containing 20% solids is obtained after heating the reaction mixture at 70° C. for 8 hours. The segmented polymer produced has an inherent viscosity (in hexamethylphosphoramide) of 0.97.

To the above solution of segmented polymer is added about 0.16 part of 2,4,6-tris-(3,5-di-t-butyl-4-hydroxybenzyl)mesitylene. This solution is cast into a 20-mil thick film on a glass plate and dried at 70° C. for 16 hours. The resulting elastomer film is cut into about 3 mm. wide strips which are boiled off in a relaxed condition for one hour and then allowed to dry at room temperature. The films possess the following physical properties:

| | |
|---|---|
| Denier | 2700 |
| Tenacity, grams/denier | 0.40 |
| Elongation at break, percent | 520 |
| Unload modulus at 200% elongation (after 5 cycles to 300% elongation), grams/denier | 0.057 |
| Unload modulus at 100% elongation (after 5 cycles to 300% elongation), grams/denier | 0.031 |
| Set from 5th cycle extension to 300% elongation, percent | 13 |
| Zero strength temperature under load of about 0.002 grams/denier and in the presence of 1% of 2,4,6-tris-3,5-di-t-butyl-4-hydroxybenzyl)-mesitylene, ° C. | 213 |

Example XIV

The following example illustrates the preparation of a polyurea from 1,3-adamantane diisocyanate.

A solution of 2.18 parts of 1,3-adamantane diisocyanate in 10 parts of dry benzene is added gradually with stirring to a solution of 1.14 parts of 1,3-diaminocyclohexane (70/30 ratio of cis/trans isomers) in 10 parts of dry benzene. The resulting white polyurea has a melting point of about 275° C., at which temperature no decomposition is observed. The polyurea is soluble in N,N-dimethylacetamide, from a solution of which a film can be cast.

Example XV

This is an example of a spandex elastomer from adamantane-1,3-diisocyanate and a polyester glycol soft segment. A spandex with a polyester glycol soft segment is made from adamantane-1,3-diisocyanate, a polyester glycol (80:20 ethylene glycol: trimethylene glycol/adipic acid) of about 2000 molecular weight, and cyclohexane-1,3-diamine (70/30 cis/trans isomer mixture). The polyester glycol is reacted with adamantane-1,3-diisocyanate (about 1.6 to 2 moles of diisocyanate per mole of polyester glycol) until an isocyanate-terminated prepolymer is obtained. This is accomplished by heating at 110–130° C. for 4 to 6 hours, or at 60–80° C. for 1 hour in the presence of a catalyst such as dibutyltin dilaurate. The prepolymer is dissolved in dry hexamethyl phosphoramide and chain extended to a viscous solution by adding a stoichiometric amount of cyclohexane-1,3-diamine and stirring for 8 hours at 70° C.

An elastomeric film is obtained by casting a 20 mil film of the elastomer solution on a glass plate and evaporating the solvent at 70–80° C. for 16–24 hours.

In addition to the copolyester of ethylene glycol, trimethylene glycol and adipic acid, other polyester glycols which can be used in spandex compositions include poly-(2,2-dimethyl trimethylene adipate), poly(hexamethylene adipate), and copolyesters made from various mixtures of ethylene glycol, tetramethylene glycol, and hexamethylene glycol with a 5 to 10 carbon dicarboxylic acid.

Diamine chain extenders, other than cyclohexane-1,3-diamine, which can be used in spandex compositions, include ethylenediamine, trimethylenediamine, tetramethylene-diamine, hexamethylenediamine, meta- and para-xylylenediamines, methylene-bis(4-cyclohexylamine) as well as other single and double ring alicyclic and aralkylene diamines.

*Example XVI*

In a dry container swept with nitrogen is placed 3 grams of adamantane-1,3-diisocyanate and 10 ml. of dry hexamethyl phosphoramide. The clear solution is stirred and a solution of 1.2 grams of butane-1,4-diamine in 5 ml. of dry hexamethyl phosphoramide is slowly added until the resulting solution is slightly basic. Considerable heat is evolved during the addition of the diamine and a clear viscous solution of the polyurea results. A clear film is obtained from the solution by evaporating the solvent at about 100° C.

*Example XVII*

In a dry container swept with nitrogen is placed 3 grams of adamantane diisocyanate and 4 ml. of dry hexamethyl phosphoramide. To this solution is added 1.23 grams of butane-1,4-diol and the contents are well mixed. On addition of 1 drop of dibutyltin dilaurate, a vigorous reaction takes place with the evolution of heat. The viscosity of the solution rapidly increases and soon the solution is almost solidified. However, after heating and adding additional hexamethyl phosphoramide (8.7 ml.) with stirring, a clear solution is obtained. The solution is viscous when cold, and it can yield clear films when the solvent is evaporated at about 100° C.

The improved physical and chemical properties of the polymers of this invention are believed to be due at least in part to the rigid cyclic structure of the divalent polycyclic radical in the polymer chain, and also to the fact that the functional groups entering into the polymerization reaction are attached to bridgehead carbon atoms which do not contain hydrogen substituents. This latter requirement is believed necessary to provide stability against oxidative attack. The relatively inflexible structure of the divalent polycyclic structure reduces chain flexibility which is an important factor in determining the melting point of the polymer.

This invention comprehends copolymers, block polymers, mixed polymers and melt blends, in addition to homopolymers. For example a mixed polyester-polyamide can be prepared by heating together a mixture containing a dibasic acid, a glycol, and a diamine; or a mixture containing both a hydroxy acid and an amino acid. Various combinations of starting materials herein disclosed for preparing polymers of this invention could be employed in making the mixed polymers, as is well known to those skilled in the art.

The amount of recurring unit containing the divalent polycyclic radical which need be present in the polymer depends, inter alia, on the use to which the polymer is put. Preferably, however, at least 85% by weight of the polymer should consist of the recurring units (1)–(6), given supra.

The polyamides of this invention are the preferred polymers of this invention. These polyamides are especially useful for providing polyamide fibers of increased modulus and reduced creep which can be employed to make tire cords. For this particular use, melt blends of from about 5% to about 20% by weight of a polyamide derived from either (1) a polycyclic diamine of the type disclosed herein and a diacid such as terephthalic, isophthalic (or the like) or (2) a polycyclic amino acid of the type herein described, and about 80% to about 95% of a polyamide, such as poly(hexamethyl adipamide), polycaproamide, polyundecanoamide, poly(hexamethylene sebacamide), poly(paraxylylene azelamide), poly(metaxylylene adipamide), and polyamides from bis(4-aminocyclohexyl)methane and $C_9$ to $C_{14}$ alpha-omega dicarboxylic acids.

The polyesters of this invention have high polymer melt temperatures of about 300° C., have good thermal stability when melted, and are readily melt-extruded into films or melt-spun into fibers useful for weaving and knitting into textiles. The good heat stability apparently results from the fact that bridgehead substituents cannot eliminate. The unusually stiff polycyclic radicals in the repeating structural units of the polyester appears to be particularly beneficial for end use as textile fibers in garments, especially wash-and-wear garments where good recovery from tensile stress is essential.

The polyester-urethane-urea and polyether-urethane-urea copolymers of this invention may be represented by the repeating unit

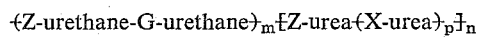

wherein G is a polymeric radical derivable by abstraction of terminal groups from a polymer having a melting point below about 60° C. and a molecular weight of between about 400 and 5000, G consisting essentially of intralinear alkylene groups interrupted by ether oxygen or carbonyloxy linkages or both. When G is interrupted by ether linkages, the recurring units of G have the formula $\{R-O-R\}$ where R is preferably an alkylene radical of the formula $-(CH_2)_n-$ where $n$ is an integer from 2 to about 10, but R may include non-alkylene units as shown later. When G is interrupted by ester linkages, the recurring units of G have the formula:

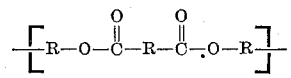

or

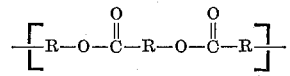

or the formulae of the type taught in U.S. Patents 3,051,687 and 3,169,945 where R has the significance noted above. The divalent radicals Z and X are chosen such that the polyurea $\{Z\text{-urea-}X\text{-urea}\}_A$ (or alternately the polyurea $\{Z\text{-urea}\}$ when $p$ equals zero) melts above 200° C. in its fiber-forming high molecular weight range.

A three-dimensional segmented polymer cross-linked through any of its groups is within the scope of the invention. One such product can be obtained by adding a triisocyanate prior to the final reaction of the pre-polymer with the diamine to give a slightly cross-linked polymer that is still processible in solution. Other means for obtaining cross-linking include curing the segmented polymer with diisocyanate. Where cross-linking is present in the segmented polymer, the requirement of a melting point of 200° C. for the polyurea segment need not be met since the necessary rigidity of the system is provided by the network structure.

The segment polymers may be copolymers, block polymers, mixed polymers, and melt blends, in addition to homopolymers. Suitable diisocyanates and diamines, in addition to the polycyclic diamines and diisocyanates, have been set forth above. It is required that in the case of a non-cross-linked segmented polymer the diamines and diisocyanate co-reactants be so chosen that if allowed to react only with one another, they would form a urea which melts above 200° C. in its fiber-forming high molecular weight range.

The low molecular weight polyether glycols which may be used include the poly(alkylene oxide) glycols, such as poly(ethylene oxide) glycol, poly(propylene oxide) glycol, poly(tetramethylene oxide) glycol, poly(pentamethylene oxide) glycol, poly(hexamethylene oxide) glycol, poly- (heptamethylene oxide) glycol, poly(octamethylene oxide) glycol, poly(nonamethylene oxide) glycol, and poly(decamethylene oxide) glycol. Mixtures of glycols may also be used to prepare copolyethers, e.g., one which would have both ethylene oxide and tetramethylene oxide units in the polyether chain.

The low molecular weight polyesters and copolyesters used in the practice of this invention can be prepared by reacting acids, esters, or acid halides with a molar excess of glycols or by condensations involving the opening of lactone rings. Suitable glycols are the polymethylene glycols, e.g., ethylene, propylene, butylene, decamethylene, substituted polymethylene glycols, such as 2,2-dimethyl-1,3-propanediol, and cycloaliphatic glycols, such as cyclohexanediol. These glycols may be reacted with the proper molar ratio of aliphatic, cycloaliphatic, or aromatic acids or their ester-forming derivatives to produce low molecular weight polymers terminating essentially with hydroxyl groups, although the presence of a few carboxyl end-groups is not detrimental. Suitable acids for preparing polyesters and/or copolyesters are succinic, adipic, suberic, sebacic, isophthalic, and hexahydroisophthalic acids. The alkyl- and halogen-substituted derivatives of these acids may also be used. In any case, a polyester is chosen such that it melts below 60° C. The polyesters poly(2,2-dimethyltrimethylene adipate) and poly(trimethylene adipate) are highly satisfactory. Mixtures and copolymers of ethers and esters may also be used.

The presence of extraneous functional groups in the G units of the chain, such as amides, urethanes and N-substituted ureas, is not harmful, and may even be useful to achieve a suitably low melting point.

Included within the polymers comprehended by this inveniton are polyurethanes and copolyurethanes composed of recurring units having the general formula:

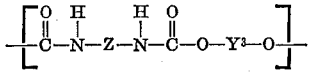

and copolymeric units where present being from the class comprising an amide, an ester, a urethane, and a urea. The components Z and Y³ are radicals derived, respectively, from a diisocyanate and a diol. Suitable diisocyanates and diols for preparing polyurethanes are set forth above.

Also included within the polymers of this invention are polyureas and copolyureas composed of the recurring unit:

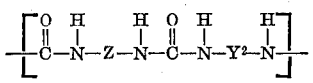

copolymeric units when present being from the class comprising an amide, an ester, a urethane, and a urea. The components Z and Y² are radicals derived, respectively, from a diisocyanate and a diamine.

The various polymers of this invention herein disclosed may be prepared in fiber-forming molecular weights and spun into fibers which have utility in the construction of fabrics for wearing apparel and other related uses. Of particular value as fibers are polyamides and polyesters of this invention. The preparation of high molecular weight polyamides is illustrated in United States Patents 2,071,250; 2,071,253; and 2,130,948. The preparation of polyurethanes is described in United States Patents 2,284,637 and 2,731,446; preparation of the polyureas is described in British Patent 535,139. The preparation of polyesters is described in United States Patent 2,465,319.

In addition to having utility as fibrous elements, the polymers of this invention can be cast into films which exhibit excellent mechanical and chemical properties.

The segmented polymers exhibit elastic properties in their fibrous state and have many applications in the field of wearing apparel and the like.

The polycyclic bridgehead diamines of this invention find their primary utility as reactants in preparing polyamides of fiber-forming molecular weight which have excellent mechanical and chemical properties. In addition, the diamines may be converted to derivatives, such as diisocyanates by well-known methods, and the latter compounds polymerized with suitable reactants to provide useful polymers of fiber-forming molecular weight.

It will be apparent that many widely different embodiments of this invention may be made without departing from the spirit and scope thereof, and therefore, it is not intended to be limited except as indicated in the appended claims.

What is claimed is:

1. A fiber-forming synthetic polymer wherein at least about 85% by weight of the recurring units have the structural formula:

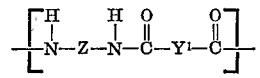

wherein Z is a divalent polycyclic radical of the class consisting of

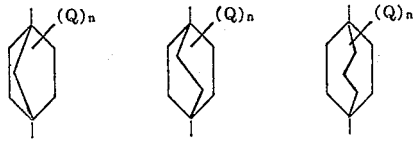

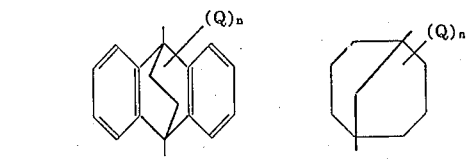

and

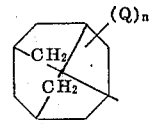

Q is selected from the class consisting of lower alkyl; $n$ is 0, 1 or 2, and Y' is a divalent hydrocarbon radical.

2. The polymer of claim 1 wherein Z has the structural formula:

3. Poly(bicyclo[2.2.2]oct-1,4-ylene sebacamide).
4. Poly(bicyclo[2.2.1]hept-1,4-ylene sebacamide).
5. Poly(adamant-1,3-ylene sebacamide).
6. Poly(9,10-dihydro-9,10 - endothanoanthr-9,10-ylene isophthalamide).

References Cited by the Examiner

UNITED STATES PATENTS

| | | | |
|---|---|---|---|
| 2,937,162 | 5/1960 | Martin et al. | 260—78 |
| 2,976,266 | 3/1961 | Lytton et al. | 260—75 |
| 2,979,486 | 4/1961 | Petropoulos | 260—75 |
| 3,053,907 | 9/1962 | Smith et al. | 260—78 |
| 3,148,202 | 9/1964 | Cox et al. | 260—78 |
| 3,154,579 | 10/1964 | Flanagan | 260—563 |
| 3,163,675 | 12/1964 | Smith | 260—563 |
| 3,213,061 | 10/1965 | Caldwell et al. | 260—78 |

WILLIAM H. SHORT, *Primary Examiner.*

SAMUEL H. BLECH, H. D. ANDERSON,
*Assistant Examiners.*